(12) United States Patent
Yamada et al.

(10) Patent No.: US 9,159,301 B2
(45) Date of Patent: Oct. 13, 2015

(54) SLANTED MAP

(71) Applicants: Hajime Yamada, Rancho Palos Verdes, CA (US); Stuart Yamamoto, La Mirada, CA (US)

(72) Inventors: Hajime Yamada, Rancho Palos Verdes, CA (US); Stuart Yamamoto, La Mirada, CA (US)

(73) Assignee: Honda Motor Co., Ltd., Minato-ku, Tokyo (JP)

( * ) Notice: Subject to any disclaimer, the term of this patent is extended or adjusted under 35 U.S.C. 154(b) by 130 days.

(21) Appl. No.: 13/888,725

(22) Filed: May 7, 2013

(65) Prior Publication Data

US 2014/0333663 A1    Nov. 13, 2014

(51) Int. Cl.
*G09G 5/14* (2006.01)
*G09G 5/377* (2006.01)

(52) U.S. Cl.
CPC ...................... *G09G 5/377* (2013.01)

(58) Field of Classification Search
CPC ........................................................ G09G 5/14
USPC ........................................................ 345/629
See application file for complete search history.

(56) References Cited

U.S. PATENT DOCUMENTS

| | | | | |
|---|---|---|---|---|
| 5,115,398 A * | 5/1992 | De Jong | ......................... | 701/523 |
| 5,642,226 A * | 6/1997 | Rosenthal | ..................... | 359/619 |
| 5,729,242 A * | 3/1998 | Margerum et al. | ............... | 345/7 |
| 5,936,553 A * | 8/1999 | Kabel | ...................... | 340/995.14 |
| 6,134,797 A * | 10/2000 | Boyce | ............................. | 33/464 |
| 6,324,009 B1 * | 11/2001 | Conley | .......................... | 359/619 |
| 6,347,012 B1 * | 2/2002 | Monson et al. | ................ | 359/451 |
| 6,523,826 B1 * | 2/2003 | Matos | ............................ | 273/155 |
| 6,648,219 B1 * | 11/2003 | Daunell | ..................... | 235/78 R |
| 6,751,024 B1 * | 6/2004 | Rosenthal | ..................... | 359/626 |
| 6,870,681 B1 * | 3/2005 | Magee | ............................. | 359/626 |
| 6,874,240 B1 * | 4/2005 | Cruttenden | ...................... | 33/451 |
| 6,903,874 B1 * | 6/2005 | Karterman | ..................... | 359/626 |
| 6,989,931 B2 * | 1/2006 | Rosenthal | ..................... | 359/619 |
| 7,182,467 B2 * | 2/2007 | Liu et al. | ......................... | 353/79 |
| 7,311,607 B2 * | 12/2007 | Tedsen et al. | ................... | 463/32 |
| 7,342,722 B2 * | 3/2008 | White | ............................ | 359/619 |
| 7,580,155 B2 * | 8/2009 | McElvain | ..................... | 358/3.06 |
| 7,593,794 B2 * | 9/2009 | Chahl et al. | ..................... | 701/13 |

(Continued)

FOREIGN PATENT DOCUMENTS

JP    2000066131    3/2000

OTHER PUBLICATIONS

TeleNav, Inc. Products, http://www.telenav.com/products/tn/, Copyright 2014.

*Primary Examiner* — Javid A Amini
(74) *Attorney, Agent, or Firm* — Quarles & Brady LLP (57) ABSTRACT

A display device generates a combined display that is viewable by the driver of a vehicle. The combined display may be composed of a plurality of displays, wherein one or more overlaying displays appear partially or completely in front of a first display, each overlaying display having an opaque portion that conveys information and a substantially transparent portion through which the first display is viewable. One or more monitors may generate the first display and overlaying displays. A monitor may be divided into multiple screens to generate a plurality of the displays. A screen that generates the first display may be directly viewable by the driver, while the screens the generate the overlaying displays may be outside the driver's line of sight. The display device may include one or more reflecting surfaces and one or more refracting surfaces for directing the overlaying displays into the driver's line of sight.

16 Claims, 5 Drawing Sheets

(56) References Cited

U.S. PATENT DOCUMENTS

| | | | |
|---|---|---|---|
| 7,830,573 B2* | 11/2010 | Ha | 359/35 |
| 8,047,575 B2* | 11/2011 | Einhorn et al. | 283/72 |
| 8,106,774 B2* | 1/2012 | Hamilton et al. | 340/572.1 |
| 8,144,138 B2* | 3/2012 | Kim et al. | 345/204 |
| 8,146,277 B2 | 4/2012 | Engel | |
| 8,152,071 B2* | 4/2012 | Doherty et al. | 235/472.01 |
| 8,172,399 B2* | 5/2012 | DeCusatis et al. | 353/8 |
| 8,189,181 B2* | 5/2012 | Liu et al. | 356/218 |
| 8,256,888 B2* | 9/2012 | Horn | 347/102 |
| 8,312,998 B2* | 11/2012 | Theisen | 211/45 |
| 8,416,499 B2* | 4/2013 | Liu et al. | 359/619 |
| 8,512,137 B2* | 8/2013 | Hayes et al. | 463/31 |
| 8,537,469 B2* | 9/2013 | Moon et al. | 359/619 |
| 8,605,006 B2* | 12/2013 | Nurmi | 345/1.1 |
| 8,622,354 B2* | 1/2014 | Sakata | 248/133 |
| 8,659,840 B2* | 2/2014 | Masuda et al. | 359/742 |
| 8,740,693 B2* | 6/2014 | Gomez et al. | 463/25 |
| 8,884,958 B2* | 11/2014 | Tsukagoshi et al. | 345/424 |
| 8,890,898 B2* | 11/2014 | Tsai et al. | 345/684 |
| 2006/0191177 A1* | 8/2006 | Engel | 40/453 |
| 2009/0141363 A1* | 6/2009 | Shin et al. | 359/630 |
| 2009/0185720 A1* | 7/2009 | Kurpinski et al. | 382/106 |
| 2009/0265088 A1 | 10/2009 | Dias et al. | |
| 2011/0052042 A1* | 3/2011 | Ben Tzvi | 382/154 |
| 2011/0134498 A1* | 6/2011 | Ohta et al. | 359/200.7 |
| 2014/0055601 A1* | 2/2014 | Yamada et al. | 348/118 |
| 2014/0226158 A1* | 8/2014 | Trainer | 356/336 |

* cited by examiner

SLANTED MAP

BACKGROUND

Modern vehicles are capable of monitoring an ever-growing amount of information. The ability to display this information in a way for a driver to easily view and interpret can be difficult. In particular, maps and directions in current vehicles are often displayed by flat-screen displays positioned in front of or to the side of the driver. These displays can be built into the vehicle's dashboard or can include separate displays that are mounted to the vehicle's dashboard or front windshield. To provide for safe operation of the vehicle, it is important that the information presented on these displays be easily viewed and understood by a driver.

When a person looks at a physical map and scenery, his or her natural instinct is to hold the map in front of him while tilting the map to be somewhat parallel to the ground. By positioning the map in this manner, the person can more easily relate the information presented on the map to the user's surroundings. Similarly, in the case of portable navigation systems, a driver can physically tilt or slant the display to achieve a tilted view of the displayed map. Some navigation devices can depict two- or three-dimensional street-level maps that mimic a tilted viewing angle. This is achieved by virtually tilting the map within the device's display to simulate depth.

Unfortunately, these devices are generally limited to a single viewing angle, based either on the physical tilt angle of the display screen, or the simulated virtual tilt angle of the map. As such, it is difficult to use these devices to convey additional important driving information, such as distance to destination, vehicle speed, and other gauge values, which should be substantially orthogonal to the driver's viewing angle to allow the driver to read the information.

SUMMARY

The disclosure relates in general to devices and methods for displaying data elements to a user. The data elements may be displayed on a number of screens, so that the various data elements may be viewed from a number of different viewing angles.

In one implementation, the present disclosure provides a device for creating a combined display viewable in a line of sight of a driver of a vehicle, the line of sight being offset by a first angle from horizontal with respect to a longitudinal axis of the vehicle. The device may be configured to generate a first display that is directly viewable by the driver at a tilt angle that corresponds to a natural orientation of a paper map held by the driver, generate a second display that is not directly viewable by the driver, and project the second display onto a first combiner of the device, the first combiner reflecting the second display into the line of sight. The combined display may comprise the first display and the reflected second display.

In another implementation, the present disclosure provides a device for creating a combined display viewable in a line of sight of a driver of a vehicle, the line of sight being offset by a first angle from horizontal with respect to a longitudinal axis of the vehicle. The device may comprise a housing comprising an aperture, the housing being positioned in the vehicle so that the driver looks into the housing through the aperture along the line of sight; a first monitor attached to the housing so that the first monitor projects into the housing a first display that is directly viewable by the driver at a tilt angle that corresponds to a natural orientation of a paper map held by the driver; a second monitor attached to the housing and projecting into the housing a second display that is not directly viewable by the driver; and a first combiner configured to receive the projection of the second display and to reflect the second display into the line of sight. The combined display may comprise the first display and the second display.

In another implementation, the present disclosure provides a device for creating a combined display viewable in a line of sight of a driver of a vehicle, the line of sight being offset by a first angle from horizontal with respect to a longitudinal axis of the vehicle. The device may comprise: a housing comprising an aperture, the housing being positioned in the vehicle so that the driver looks into the housing through the aperture along the line of sight; a first monitor attached to the housing so that a screen of the first monitor is offset from horizontal by a viewing angle and is directly viewable by the driver along the line of sight, the first monitor displaying on the screen a first display; a second monitor attached to the housing outside of the line of sight and projecting into the housing a second display that is not directly viewable by the driver; a third monitor attached to the housing outside the line of sight and projecting into the housing a third display that is not directly viewable by the driver; a first combiner configured to receive the projection of the second display from the second monitor and reflect the second display along the line of sight so that the second display appears to the driver to be displayed on a first virtual panel orthogonal to the line of sight; and a second combiner configured to receive the projection of the third display from the third monitor and reflect the third display along the line of sight so that the third display appears to the driver to be displayed on a second virtual panel orthogonal to the line of sight. The combined display may comprise the first display, second display, and third display.

DETAILED DESCRIPTION OF THE DRAWINGS

The disclosure relates in general to a display device and display production methods for a system that may be utilized in combination with a vehicle, wherein geographic information, such as map data, is shown at a first viewing angle and other data elements, such as driving, vehicle, or environment information, is shown at a second viewing angle that is separate and non-parallel from the first viewing angle. The map data may be displayed in conjunction with one or more other information displays so that the map data is oriented along a non-parallel viewing plane with respect to the other displays. The slanted map display provides easier map viewing by the driver in a more natural orientation (i.e., tilted in the same manner as a paper map), and allows the driver to view additional information without cluttering the map display.

The present system and method is presented in several varying embodiments in the following description with reference to the Figures, in which like numbers represent the same or similar elements. Reference throughout this specification to "one embodiment," "an embodiment," "one implementation," "some implementations," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The described features, structures, or characteristics of the disclosure may be combined in any suitable manner in one or more embodiments. In the following description, numerous specific details are recited to provide a thorough understanding of embodiments of the system. The system and method may both be practiced without one or more of the specific details, or with other methods, components, materials, and so forth. In other instances, well-known structures, materials, or operations are not shown or described in detail to avoid obscuring aspects of the disclosure.

Figure 1:
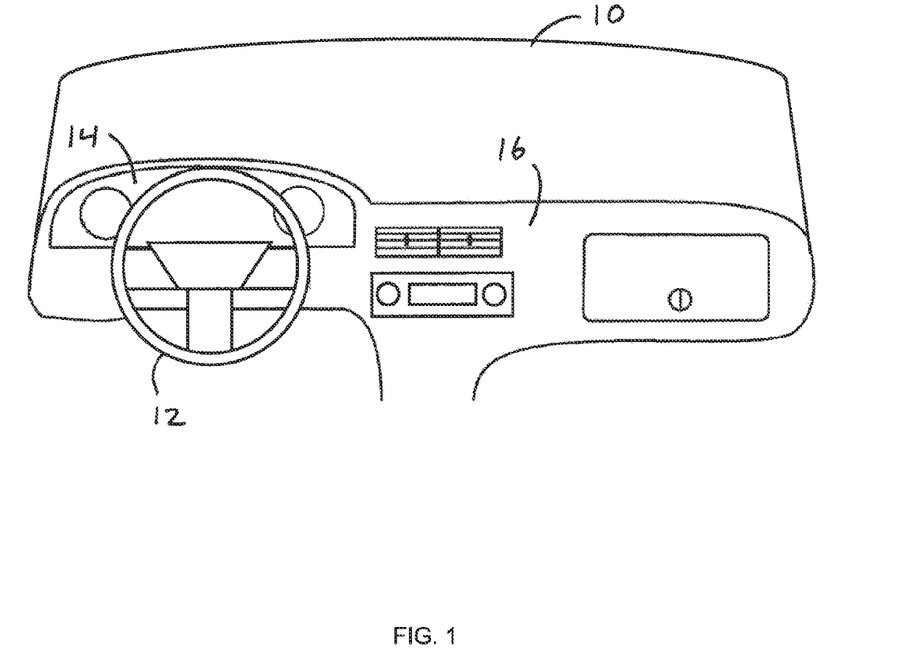
FIG. 1 illustrates a vehicle interior that may accommodate a display device in accordance with the present disclosure.

FIG. 1 illustrates a vehicle interior having a dashboard 10, a steering wheel 12, and an instrument panel 14 mounted in a console 16. The driver sits behind the steering wheel 12, which is toward the bottom of the page from the steering wheel 12, and while driving shifts between looking out the front windshield and reviewing instruments in the instrument panel 14.

The present disclosure relates to a display device and method for displaying information that may be used, for example, in conjunction with instrument panel 14. To enable the driver to more easily and quickly review and appreciate information depicted via the display device, the present disclosure provides devices and methods for displaying a number of displays, the displays including at least a first data set (e.g., map data) presented at a first angle to a vehicle driver's view, while simultaneously displaying one or more other data elements presented to the driver at one or more angles different from the first angle. The display device may be positioned in front of the driver (e.g., with instrument panel 14) to allow the driver to see the road easily while viewing the displayed information. The device and methods may be used to display the map data at an angle that allows the driver to relate the map information to the surrounding environment. The device and methods may further be used to display informational data elements such as navigation data, vehicle sensor and gauge data, environmental sensor data, alerts, and the like. The displays (and the data elements contained therein) may be presented orthogonally to the driver's line of sight so that they may be easily read or otherwise viewed by the driver.

The present display device may be mounted at any suitable location in the vehicle interior such that the displays output by the device are viewable by the driver as described below. The displays may be presented within the instrument panel 14, above the instrument panel 14 on the dashboard 10, or on the windshield, though other suitable locations may be utilized. The displays may be presented in front of the driver, so that the driver can view the displays facing forward, without diverting his or her attention from the road. Alternatively, the displays may be presented to the driver at an angle from the driver's forward-facing position.

Figure 2:
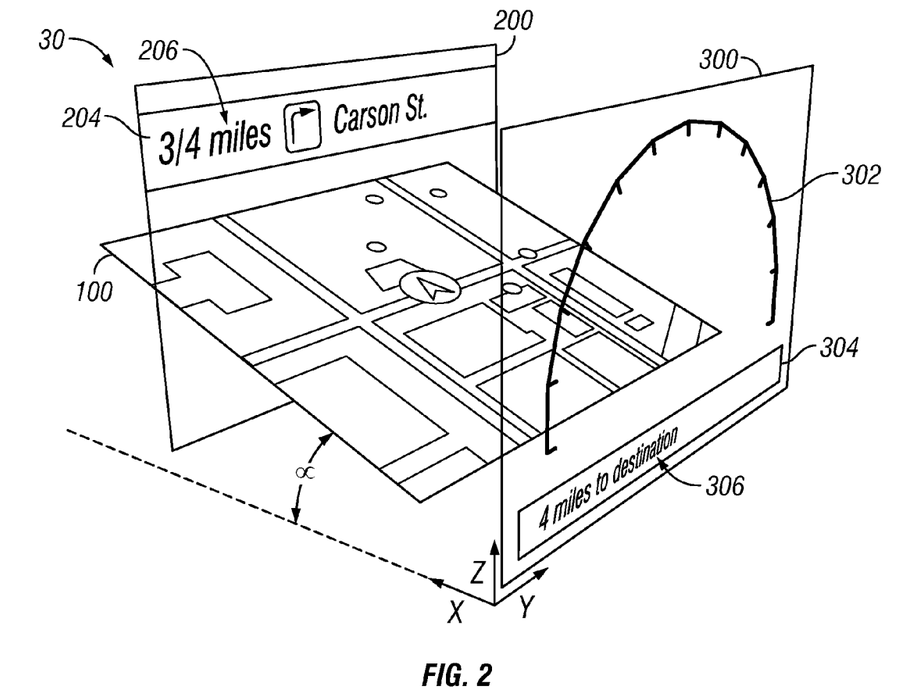
FIG. 2 illustrates a perspective view of a first display and a plurality of overlaying displays arranged to create a combined display in accordance with the present disclosure.
Figure 3:
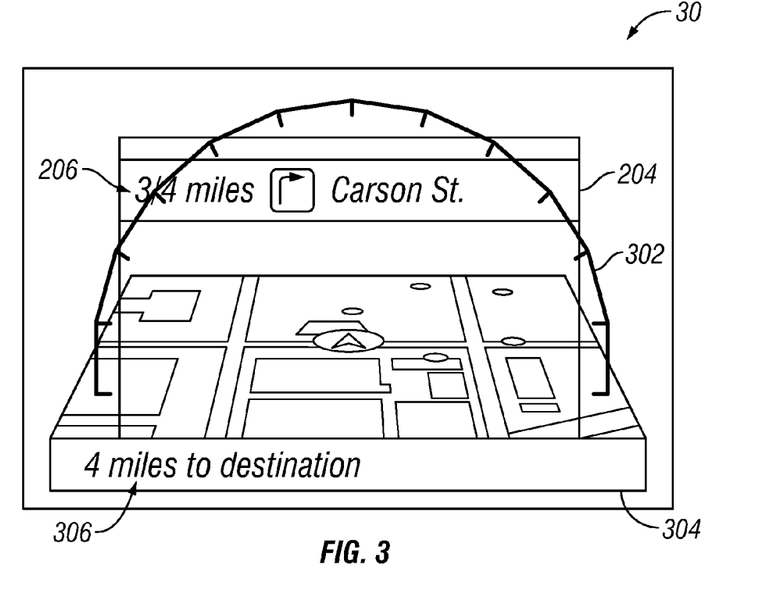
FIG. 3 illustrates a combined display as viewed by a vehicle driver in accordance with the present disclosure.

FIGS. 2 and 3 illustrate an exemplary combined display 30 and output that may be created by the present display device and methods. A first display 100, second display 200, and third display 300 are presented to a viewer, typically the driver of a vehicle, so as to appear as a single informational display. FIG. 2 illustrates an arrangement of the displays 100, 200, 300, and FIG. 3 illustrates the combined display 30 as it appears to the viewer. The displays 100, 200, 300 may be substantially planar, and may be oriented with respect to the driver's line-of-sight, which is along the x-axis of the set of x-y-z axes of FIG. 1. The first display 100 may be tilted at an angle $\alpha$ of between 0 and 90 degrees, non-inclusive, from the x-axis. The first display 100 may include a digitized projection of a single or a composite map. Any suitable projection of the map may be displayed; in some implementations, an overhead or "bird's eye" projection is used, in order to simulate the driver's use of a paper map. The projection may be displayed from any suitable elevation, which may be adjustable by the driver. The map elevation and the tilt angle $\alpha$ of the first display 100 may together present the map to the driver in a natural orientation. The tilt angle $\alpha$ of the first display 100 with respect to the line of sight may be adjustable, such as by rotating the monitor generating the first display 100 as described below. In some implementations, the map may be used as a navigational tool, and thus may be focused on and display the vehicle's current location. The map may automatically reposition as the vehicle moves to keep the vehicle position in focus. The device may receive global positioning system ("GPS") data or other positioning data to update the vehicle position as is known in the art.

The first display 100 may further display other vehicle information, such as the vehicle heading and altitude, in combination with the map. In some implementations, the first display 100 may be configured to switch from displaying a map to displaying another substantially opaque image or a pre-recorded or live video. For example, in a vehicle equipped with a back-up camera as is known in the art, when the back-up camera is activated the first display 100 can switch away from the map to displaying a video feed from the back-up camera. The first display 100 and another display, such as the second display 200, may cooperate to form a composite image. For example, the top half of an image, such as the back-up camera video feed, can be displayed in the second display 200, and the bottom half of the image can be displayed in the first display 100 so that the image appears seamlessly to the driver.

The second display 200 and third display 300 may be orthogonal to the x-axis, thus lying in the plane formed by the y- and z-axes as illustrated, or may be deflected from the z-axis by an angle that accommodates the information being displayed thereon. One or both of the second display 200 and third display 300 may include an overlay of the first display 100. An overlay, as used in this description, is a graphical representation of information in which part of the representation is transparent or substantially translucent, so that part or all of a display positioned behind the overlay is visible. The information represented in the overlay may be fully or substantially opaque. In the illustrated example, the second display 200 and third display 300 are both overlays. The second display 200 intersects the first display 100 so that an upper portion 202 of the second display 200, which contains data elements to be displayed to the driver, is in front of the first display 100 with respect to the x-axis. The data elements of the illustrated upper portion 202 are a partially translucent text bar 204 and an opaque next navigation instruction 206 comprising text and a graphic indicator of the direction to turn the vehicle. The remainder of the second display 200 is transparent. The third display 300 is positioned in front of the first display 100 and second display 200. The third display 300 has an opaque speedometer graphic 302, a partially translucent text bar 304, and an opaque navigation destination status 306 comprising text. The remainder of the third display 300 is transparent.

With reference to the illustrated example, the combined display may combine any number of overlaying displays, such as the second display 200 and third display 300, for providing information that can be overlaid over the map of the first display 100. An overlaying display may be permanent, in that it is displayed continuously as the first display 100 is displayed. Such an overlay may be used to convey information without detrimentally obscuring the map. Alternatively, an overlaying display may be temporary or intermittent. For example, an overlaying display may only appear in the combined display momentarily to convey an alert to the driver, or may appear and disappear at regular or irregular intervals or upon occurrence of an event, such as the vehicle coming to a stop or an incoming phone call over a Bluetooth-connected phone, to convey vehicle or environment information. In some implementations, a display device for generating the displays 100, 200, 300 may be configured to modify the displays in order to provoke a shift in the driver's focus between the displays. For example, the map of the first display 100 may be brightly lit during normal operation. Then, in order to display a call notification, the map is dimmed and the third display 300 is modified to display the call notification.

The first display 100 and any overlaying displays, such as the second display 200 and third display 300, may be produced using any suitable display technique or a combination thereof. Suitable techniques include using a display panel that is opaque, translucent, or transparent, and generates images using cathode ray tubes, light-emitting diodes, liquid crystals (i.e. LCD panels), liquid crystal on silicon, digital micromirrors, and other imaging technologies. Suitable techniques may further include heads-up display technologies such as optical waveguides, collimation mirrors, combiners, scanning lasers, and the like.

Referring to FIGS. 4-7, a display device 40 may be used to provide the combined display. In some implementations, the components of the display device, such as the first monitor 46, second monitor 48, third monitor 49, first combiner 54, second combiner 56, and optical panel 64 of FIG. 4, may be fixedly or adjustably arranged within a housing 42, shown in cross-section in FIG. 5, into which the driver directs his line of sight, represented by vector line L-L, through an aperture 44 in the housing 42. The housing 42 may be attached to or integral with one or both of the dashboard 10 and the console 16. In some implementations, the housing 42 may replace the instrument panel 14, or may be integral with the instrument panel 14, so that the driver looks into the aperture 44 along the line of slight L-L above or through the steering wheel 12. In other implementations, the housing 42 may be attached to or integral with the dashboard 10 or console 16, approximately centered between the front seats of the vehicle.

Figure 4:
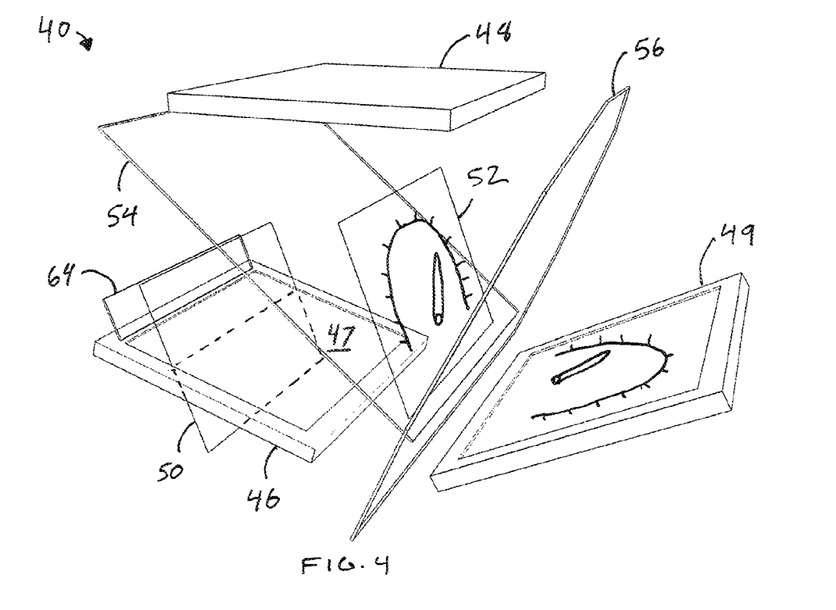
FIG. 4 illustrates a perspective view of a first embodiment of a display device in accordance with the present disclosure.
Figure 5:
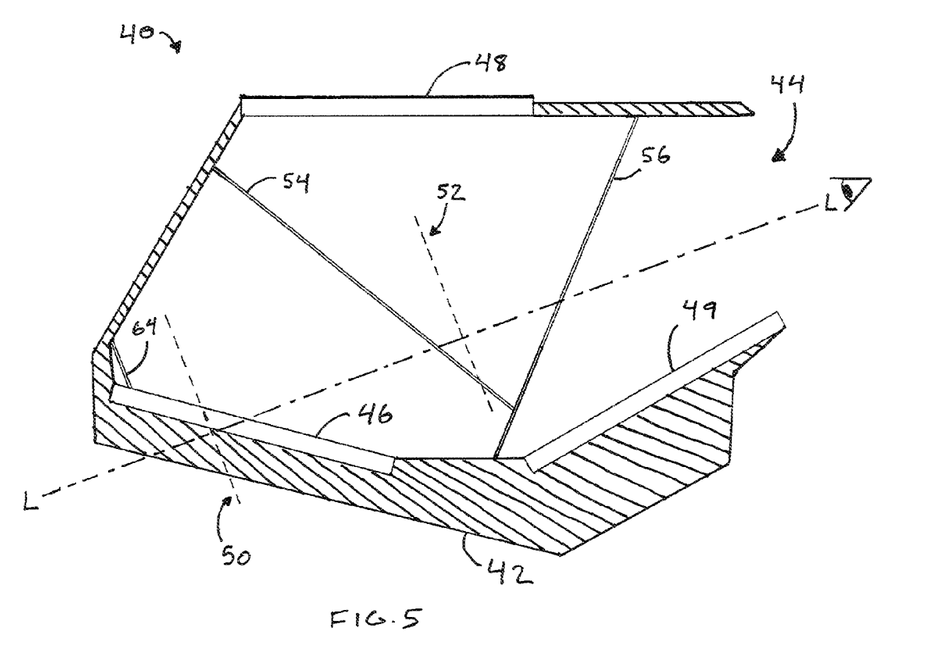
FIG. 5 illustrates a side view of the first embodiment of the display device in accordance with the present disclosure.

One or more monitors 46, 48, 49 for generating the displays may be attached to the housing 42 and oriented so that the displays generated by each monitor 46, 48, 49 are projected into the housing and, by direct or reflected viewing as described below, are viewed by the driver. In some implementations, the device 40 may include one monitor for each desired display, so that each monitor is dedicated to its single display. In other implementations, one or more of the monitors may be configured to generate a plurality of displays, each of which may be viewed directly by the driver or reflected as described below. The monitors 46, 48, 49 may use one or a combination of the display techniques described above. The monitors 46, 48, 49 may have a viewing area that is suitable for the desired use. For example, a monitor that generates a single display may be between about three inches and about eight inches on the diagonal, while a monitor that generates multiple displays may be 15-17 inches or larger, depending on the number of displays.

A first monitor 46 may be positioned within the device 40 so that a screen 47 of the first monitor 46 is directly viewable by the driver along the line of sight L-L. By directly viewable, it is meant that the driver can see a display, such as the first display 100, generated on the screen 47. In contrast, displays reflected by a combiner or other component, as described below, are not directly viewed by the driver. The first monitor 46 may be horizontal with respect to a longitudinal axis of the vehicle, which is substantially parallel to the surface on which the vehicle is being driven. The first monitor 46 may alternatively be deflected from horizontal by a desired viewing angle, so that the orientation of the first monitor 46 creates a suitable tilt angle α at which the first display 100 is viewed by the driver as described above. That is, the tilt angle α may be the sum of the viewing angle with the angle between the driver's line of sight and the vehicle's longitudinal axis. The device 40 may be configured to allow the driver to rotate the first monitor 46 to change the viewing angle and thus the tilt angle α of the first display 100 with respect to the driver's line of sight. In some embodiments, the screen 47 displays a map at a bird's-eye view while the driver is operating the vehicle. The orientation and position of the first monitor 46 with respect to the driver allows the map to be presented as if the driver were holding a paper map in front of him.

The device 40 may further include one or more combiners 54, 56. As used herein, a "combiner" is a reflective, fully or substantially transparent panel, such as a glass panel. The glass used in such a glass panel may be any fully or substantially transparent glass exhibiting the desired reflective properties, and may be tempered, polarized, doped, or coated with materials that facilitate the desired reflective properties. A combiner 54, 56 receives one or more displays generated by one or more monitors and is positioned to reflect the received displays into the driver's line of sight, so that the display is viewable by the driver. A combiner 54, 56 may be further configured to reflect only a portion of the display as it is generated by the monitor, such as to achieve a holographic or other overlaying effect. A combiner may be further configured to reflect the displays so they appear to the driver at a desired "virtual distance;" that is, the display is reflected into a plane that is further away from the driver than the combiner reflecting the display. The viewable portion of this plane is referred to herein as a "virtual panel" 50, 52 having the dimensions of the reflected display. The virtual panel 50, 52 may be orthogonal to the driver's line of sight.

Referring to FIGS. 4 and 5, in a first embodiment of a device 40 for creating the combined display of FIGS. 2 and 3 may include the first monitor 46 for generating the first display 100 directly viewable on the screen 47, a second monitor 48 generating the second display 200 and projecting it onto a first combiner 54, and a third monitor 49 for generating the third display 300 and projecting it onto a second combiner 56. The first monitor 46 may be a flat-panel monitor, such as an LCD monitor, positioned at the bottom and toward the back of the housing 42. The first monitor 46 may be angled at the desired viewing angle, and may be fixed at that angle or rotatable using a rotating mechanism. The second monitor 48 may be a flat-panel monitor, such as an LCD monitor, positioned at the top of the housing 42 such that the second monitor 48 may not be directly viewable by the driver along the line of sight L-L. The second monitor 48 may be horizontal with respect to the longitudinal axis of the vehicle, as illustrated in FIG. 5, or the second monitor 48 may be deflected from horizontal as needed to create the desired shape of the housing 42. The second monitor 48 may be rotatable using a rotating mechanism as described above. The third monitor 49 may be a flat-panel monitor, such as an LCD monitor, positioned near the bottom and near the front of the housing 42 such that the third monitor 49 may not be directly viewable by the driver along the line of sight L-L. The third monitor 49 may be horizontal with respect to the longitudinal axis of the vehicle, or may be deflected from horizontal as needed to create the desired shape of the housing 42, as illustrated in FIG. 5. The third monitor 49 may be rotatable using a rotating mechanism as described above.

The first combiner 54 and second combiner 56 are positioned and oriented in order to create, respectively, a first virtual panel 50 displaying the second display 200 and a second virtual panel 52 displaying the third display 300. The combiners 54, 56 are angled with respect to their corresponding monitors 48, 49 in order to project the displays 200, 300 onto the virtual panels 50, 52 at a desired angle with respect to the line of sight L-L. In some implementations, one or both of the first virtual panel 50 and second virtual panel 52 are orthogonal to the line of sight L-L, as illustrated in FIGS. 4-7, to approximate the driver's view of a typical instrument panel 14. The second monitor 48 projects the second display 200 onto the first combiner 54, which reflects the second display 200 along the driver's line of sight L-L so that it appears to the driver at the virtual distance of the first virtual panel 50. The first virtual panel 50 may be positioned so that the second display 200 overlays the first display 100 as desired. In some implementations, the first virtual panel 50 may intersect the screen 47, for example as illustrated. When the screen 47 opaquely displays the first display 100, the device 40 may convey to the driver a visual effect of obscuring the portion of the first virtual panel 50 below the screen 47. However, the portion that is not visible to the driver may become visible if the first monitor 46 stops displaying the first display 100. Furthermore, because the second display 200 is reflected to the driver and is not physically at the depth of the first virtual panel 50, the device 40 may convey the second display 200 as if it is not obscured by its intersection with the screen 47. Additionally or alternatively, the device 40 may convey a cooperative view that includes a composite image formed by the first display 100 and second display 200, examples of which composite image include, without limitation: a seamless image as described above; an image including a map in the first display 100 and a graphic representing the horizon in the second display 200; an image that conveys a three-dimensional effect, showing buildings or terrain that appear on the map displayed in the first display 100.

Similarly to the arrangement of the second monitor 48 and first combiner 54, the third monitor 49 projects the third display 300 onto the second combiner 56, which reflects the third display 300 along the driver's line of sight L-L so that it appears to the driver at the virtual distance of the second virtual panel 52. The second virtual panel 52 may be positioned so that the third display 300 overlays the first display 100 as desired.

The device 40 may further include one or more optical panels 64 for displaying additional directly viewable data elements to the driver. An optical panel 64 may use any of the display technologies described above. In some implementations, the optical panel 64 is an organic electro-luminescent glass panel that receives vehicle information and displays associated data elements to the driver. For example, the optical panel 64 may include encapsulated agents for displaying the left and right turn indicators, with the remainder of the glass panel being transparent. The optical panel 64 may be positioned in front of or behind any virtual panel displaying an overlaying display, and may be positioned in front of or above the screen 47 displaying the first display 100.

Figure 6:
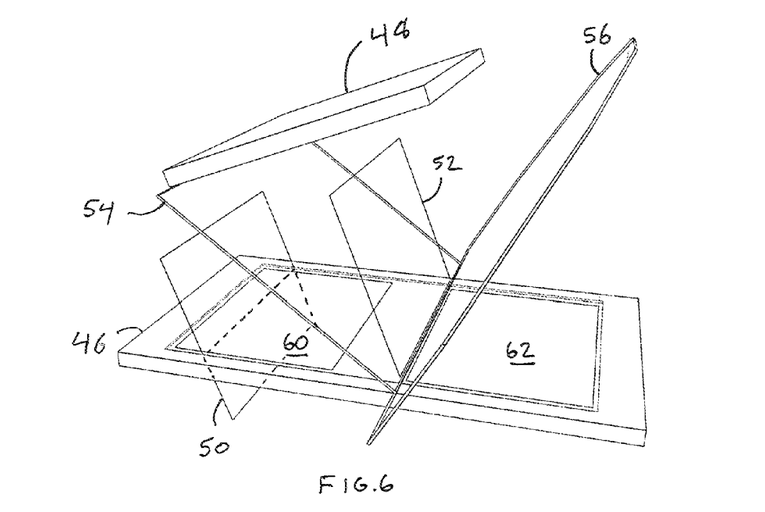
FIG. 6 illustrates a perspective view of a second embodiment of a display device in accordance with the present disclosure.
Figure 7:
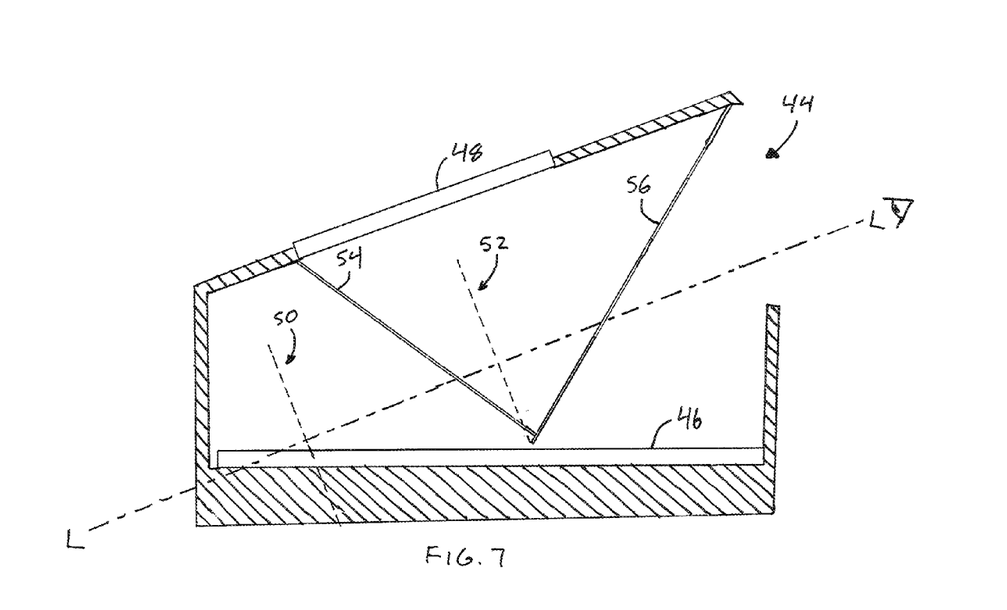
FIG. 7 illustrates a side view of the second embodiment of the display device in accordance with the present disclosure.

Referring to FIGS. 6 and 7, in a second embodiment of the device 40, the device 40 may be positioned in the vehicle so that the driver's line of sight L-L is deflected from horizontal by the above-described tilt angle α and the first monitor 46 is positioned horizontally at the bottom of the housing 42. To create the combined display of FIGS. 2 and 3, the first monitor 46 may generate the first display 100 and third display 300, and the second monitor 48 may generate the second display 200, while the third monitor 49 is omitted. The first monitor 46 may be a flat-panel monitor having a first screen 60 and a second screen 62. The first screen 60 lies within the driver's line of sight L-L and is therefore directly viewable by the driver. The first screen 60 may produce the first display 100. The second screen 62 may lie outside of the line of sight L-L and may produce the third display 300. The second combiner 56 may be positioned to receive the third display 300 from the second screen 62 and reflect the third display 300 along the line of sight L-L so that it appears to the driver at the second virtual panel 52. The second monitor 48 and first combiner 54 operate as described above to generate the second display 200 on the first virtual panel 50.

Figure 8:
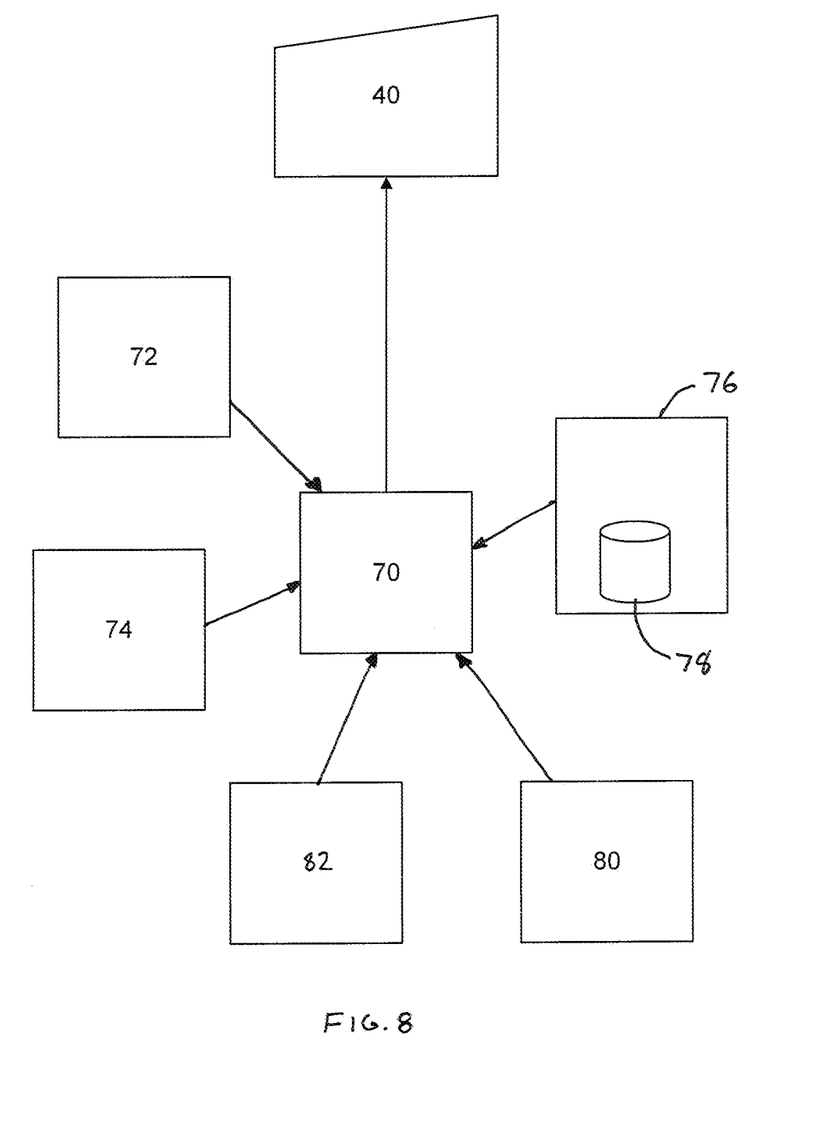
FIG. 8 illustrates a diagram of a combined display system incorporating a display device in accordance with the present disclosure.

Referring to FIG. 8, the display device 40 may be electrically connected to one or more computing units 70 which process information and deliver the information to the display device 40 for inclusion in the combined display. Processing the information may include generating, receiving, retrieving, compiling, filtering, formatting, encrypting, decrypting, or performing other actions upon the information, depending on the type and source of the information. The computing unit 70 may be a single unit, such as a vehicle central processing unit, that provides information to the display device 40 for creating the first display and all overlaying displays. Alternatively, the display device 40 may be connected to a plurality of computing units 70 that provide different types of information. In one implementation, each monitor 46, 48 of the display device 40 may be attached to one or more separate computing units 70 that provide the information to be incorporated into the displays generated by that monitor. For example, the first monitor 46 can be dedicated to generating a map, and can be connected to a computing unit 70 that accesses a map database, while the second monitor 48 generates an overlaying display that includes a speedometer and navigation instructions, and can be connected to a computing unit 70 that receives vehicle speed data and a computing unit 70 that receives navigation data.

Correspondingly, a computing unit 70 may communicate electronically with one or more data sources. The data sources may be remote from, physically or electrically attached to, or incorporated within the computing unit 70. The data sources may provide to the computing unit 70 information to be processed by the computing unit 70 and potentially included in the combined display. A data source may be any suitable device, data store, or combination thereof that generates, detects, collects, records, calculates, aggregates, or otherwise acquires information that may be communicated to the driver using the combined display. In a vehicle, suitable data sources may include, without limitation: one or more vehicle information sensors 72, such as a wheel speed sensor, interior or exterior temperature sensor, engine temperature sensor, oil pressure sensor, fuel gauge, and the like; a GPS or other navigation device 74 that receives or produces vehicle positioning data; a map module 76 having a map database 78 containing geographical information; a navigation module 80 that may provide, for example, driving directions from the vehicle's current location to a destination; and, an input interface 82 that receives input from the driver or another user, such as a destination address or display parameters.

In some implementations, a method of generating a combined display for a driver of a vehicle may comprise providing a display device configured to generate a plurality of displays that combine to form the combined display in a position that is viewable by the driver. The provided device may be further configured to generate a map in one of the displays that is directly viewable by the driver. The provided device may be further configured to generate one or more overlays that are refracted and reflected into the driver's line of sight. The method may further comprise electrically connecting the display device to a vehicle computer and providing information from the computer to the device, the information comprising images and text to be displayed in the combined display.

Although the present disclosure has been described with respect to preferred embodiments, any person skilled in the art will recognize that changes may be made in form and detail, and equivalents may be substituted for elements of the disclosure without departing from the spirit and scope of the disclosure. Therefore, it is intended that the disclosure not be limited to the particular embodiments, but will include all embodiments falling within the scope of the appended claims.

What is claimed is:

1. A device for creating a combined display viewable in a line of sight of a driver of a vehicle, the line of sight being offset by a first angle from horizontal with respect to a longitudinal axis of the vehicle, the device configured to:
    generate a first display that is directly viewable by the driver at a tilt angle that corresponds to a natural orientation of a paper map held by the driver;
    generate a second display that is not directly viewable by the driver;
    project the second display onto a first combiner of the device, the first combiner reflecting the second display into the line of sight, the combined display comprising the first display and the reflected second display;
    generate a third display, the combined display comprising the third display; and
    project the third display onto a second combiner of the device, the second combiner reflecting the third display into the line of sight, wherein the second display appears to the driver to be displayed on a first virtual panel orthogonal to the line of sight, and wherein the third display appears to the driver to be displayed on a second virtual pane orthogonal to the line of sight.

2. The device of claim 1, wherein the device comprises a first monitor configured to generate the first display.

3. The device of claim 2, wherein the first monitor is positioned substantially horizontally, and wherein the tilt angle is the same as the first angle.

4. The device of claim 2, wherein the first monitor is offset from horizontal by a viewing angle, and wherein the tilt angle is the sum of the first angle and the viewing angle.

5. The device of claim 2, wherein the first monitor is configured to generate the second display.

6. The device of claim 5 being configured to:
    generate a third display that is not directly viewable by the driver; and
    project the third display onto a second combiner of the device, the second combiner reflecting the third display into the line of sight, the combined display comprising the reflected third display.

7. The device of claim 6, wherein the device comprises a second monitor configured to generate the third display.

8. The device of claim 2, wherein the device comprises a second monitor configured to generate the second display and project the second display onto the first combiner.

9. The device of claim 1, wherein the first display comprises a map and the second and third displays each comprise an overlaying display.

10. A device for creating a combined display viewable in a line of sight of a driver of a vehicle, the line of sight being offset by a first angle from horizontal with respect to a longitudinal axis of the vehicle, the device comprising:
    a housing comprising an aperture, the housing being positioned in the vehicle so that the driver looks into the housing through the aperture along the line of sight;
    a first monitor attached to the housing so that the first monitor projects into the housing a first display that is directly viewable by the driver at a tilt angle that corresponds to a natural orientation of a paper map held by the driver and a third display that is not directly viewable by the driver;
    a second monitor attached to the housing and projecting into the housing a second display that is not directly viewable by the driver;
    a first combiner configured to receive the projection of the second display and to reflect the second display into the line of sight;
    the combined display comprising the first display, the second display, and the third display; and
    a second combiner configured to receive the projection of the third display and to reflect the third display into the line of sight; and
    wherein the second display appears to the driver to be displayed on a first virtual panel orthogonal to the line of sight, and wherein the third display appears to the driver to be displayed on a second virtual panel orthogonal to the line of sight.

11. The device of claim 10 wherein the combiner reflects the second display so that the second display appears to the driver to be displayed on a first virtual panel that is orthogonal to the line of sight.

12. The device of claim 10 wherein the first display comprises a map and the second display comprises an overlaying display.

13. The device of claim 10 wherein the first monitor is offset from horizontal by a viewing angle, and wherein the tilt angle is the sum of the first angle and the viewing angle.

14. The device of claim 10 wherein the first monitor is substantially horizontal, and wherein the tilt angle is the first angle.

15. A device for creating a combined display viewable in a line of sight of a driver of a vehicle, the line of sight being offset by a first angle from horizontal with respect to a longitudinal axis of the vehicle, the device comprising:
    a housing comprising an aperture, the housing being positioned in the vehicle so that the driver looks into the housing through the aperture along the line of sight;
    a first monitor attached to the housing so that a screen of the first monitor is offset from horizontal by a viewing angle and is directly viewable by the driver along the line of sight, the first monitor displaying on the screen a first display;

a second monitor attached to the housing outside of the line of sight and projecting into the housing a second display that is not directly viewable by the driver;

a third monitor attached to the housing outside the line of sight and projecting into the housing a third display that is not directly viewable by the driver;

a first combiner configured to receive the projection of the second display from the second monitor and reflect the second display along the line of sight so that the second display appears to the driver to be displayed on a first virtual panel orthogonal to the line of sight; and a second combiner configured to receive the projection of the third display from the third monitor and reflect the third display along the line of sight so that the third display appears to the driver to be displayed on a second virtual panel orthogonal to the line of sight;

the combined display comprising the first display, second display, and third display.

16. The device of claim 15 wherein the first display comprises a map and the second and third displays each comprise an overlaying display.

\* \* \* \* \*